US011024858B2

(12) United States Patent
Stoehr et al.

(10) Patent No.: US 11,024,858 B2
(45) Date of Patent: Jun. 1, 2021

(54) SEPARATOR PLATE WITH DECREASED BASE WIDTH OF ONE BEAD FLANK AND ELECTROCHEMICAL SYSTEM

(71) Applicant: REINZ-DICHTUNGS-GMBH, Neu-Ulm (DE)

(72) Inventors: Thomas Stoehr, Laupheim (DE); Claudia Kunz, Ulm (DE); Stephan Wenzel, Pfaffenhofen (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 11 days.

(21) Appl. No.: 15/519,974

(22) PCT Filed: Oct. 16, 2015

(86) PCT No.: PCT/EP2015/074016
§ 371 (c)(1),
(2) Date: Apr. 18, 2017

(87) PCT Pub. No.: WO2016/059215
PCT Pub. Date: Apr. 21, 2016

(65) Prior Publication Data
US 2017/0324099 A1    Nov. 9, 2017

(30) Foreign Application Priority Data

Oct. 18, 2014 (DE) ...................... 20 2014 008 375.4

(51) Int. Cl.
*H01M 8/0273* (2016.01)
*H01M 8/2483* (2016.01)
(Continued)

(52) U.S. Cl.
CPC ........... *H01M 8/0273* (2013.01); *C25B 9/203* (2013.01); *H01M 8/0202* (2013.01);
(Continued)

(58) Field of Classification Search
CPC ............. H01M 8/0273; H01M 8/0276; H01M 8/0271; H01M 8/2483; H01M 8/2465;
(Continued)

(56) References Cited

U.S. PATENT DOCUMENTS 7,718,293 B2    5/2010 Stroebel et al.
2005/0064267 A1    3/2005 Guttermann et al.
(Continued)

FOREIGN PATENT DOCUMENTS

DE    10158772 C1    6/2003
DE    20308332 U1    2/2004
(Continued)

OTHER PUBLICATIONS

Machine translation JP 2007-042510, Feb. 2007, Nishida Tsunemasa (Year: 2007).*

(Continued)

*Primary Examiner* — Kwang Han
(74) *Attorney, Agent, or Firm* — McCoy Russell LLP

(57) ABSTRACT

A separator plate for an electrochemical system has two metal individual plates. The plates have passage openings for operating media and possibly coolant, and distribution structures. The distribution structures are formed in the metal individual plates and which each communicate with at least two of the passage openings. A peripherally extending sealing structure is formed in each of the metal individual plates at least peripherally around the electrochemically active region and at a distance therefrom and/or peripherally around at least one of the passage openings and at a distance from the edge thereof. The cross-section of the sealing structure has a bead roof, two bead flanks, and at least in some segments, two bead feet. At least in the region of the bead roof of the sealing structure at least in some segments, (Continued)

the sealing structure extends sinuously with at least two wave periods having convex and concave segments.

14 Claims, 12 Drawing Sheets

(51) Int. Cl.
  *H01M 8/0271* (2016.01)
  *H01M 8/0276* (2016.01)
  *H01M 8/0202* (2016.01)
  *H01M 8/0247* (2016.01)
  *C25B 9/20* (2006.01)
  *H01M 8/1018* (2016.01)

(52) U.S. Cl.
  CPC ....... *H01M 8/0271* (2013.01); *H01M 8/0276* (2013.01); *H01M 8/2483* (2016.02); *H01M 8/0247* (2013.01); *H01M 2008/1095* (2013.01)

(58) Field of Classification Search
  CPC ............. H01M 8/0202; H01M 8/0247; H01M 2008/1095; C25B 9/203
  See application file for complete search history.

(56) References Cited

U.S. PATENT DOCUMENTS

| | | | |
|---|---|---|---|
| 2007/0020505 A1 | 1/2007 | Gaff et al. | |
| 2007/0231619 A1* | 10/2007 | Strobel | C25B 9/203 429/457 |
| 2012/0164560 A1* | 6/2012 | Keyser | H01M 8/0204 429/516 |

FOREIGN PATENT DOCUMENTS

| | | | |
|---|---|---|---|
| DE | 102007007392 A1 | | 8/2007 |
| DE | 202012004927 U1 | | 8/2013 |
| JP | 02-009371 U1 | | 1/1990 |
| JP | 06-047772 U | | 6/1994 |
| JP | 2006504872 A | | 2/2006 |
| JP | 2006161915 A | | 6/2006 |
| JP | 2007-262440 | * | 2/2007 ............. H01M 8/02 |
| JP | 2007035449 A | | 2/2007 |
| JP | 2007042510 A | | 2/2007 |
| JP | 2007103248 A | | 4/2007 |
| JP | 2007141550 A | | 6/2007 |
| JP | 2007250206 A | | 9/2007 |
| JP | 2007311074 A | | 11/2007 |
| JP | 2009099423 A | | 5/2009 |
| JP | 2009269248 A | | 11/2009 |
| JP | 2010540776 A | | 12/2010 |
| JP | 2011129267 A | | 6/2011 |
| WO | 2004/036677 A2 | | 4/2004 |
| WO | 2004/112178 A2 | | 12/2004 |

OTHER PUBLICATIONS

European Patent Office, International Search Report and Written Opionion, issued in PCT/EP2015/074016, Dec. 23, 2015, 16 pages, European Patent Office, Rijswijk, Netherlands.

* cited by examiner

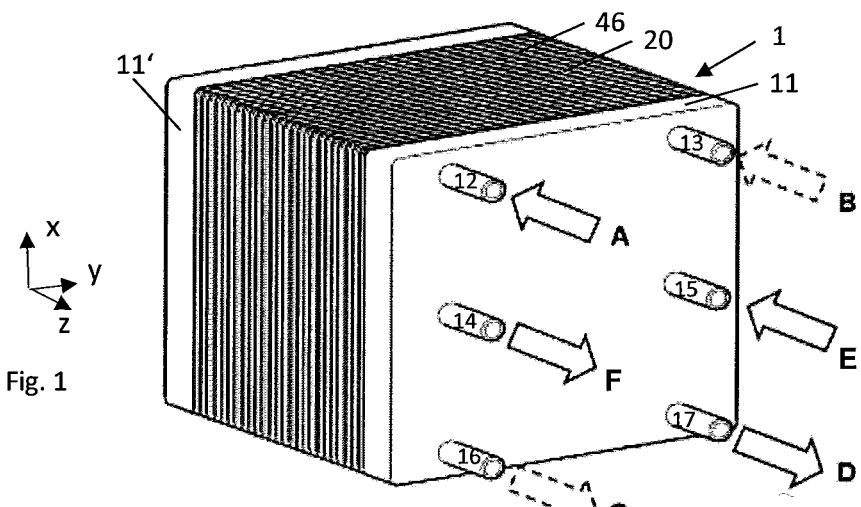
Fig. 1
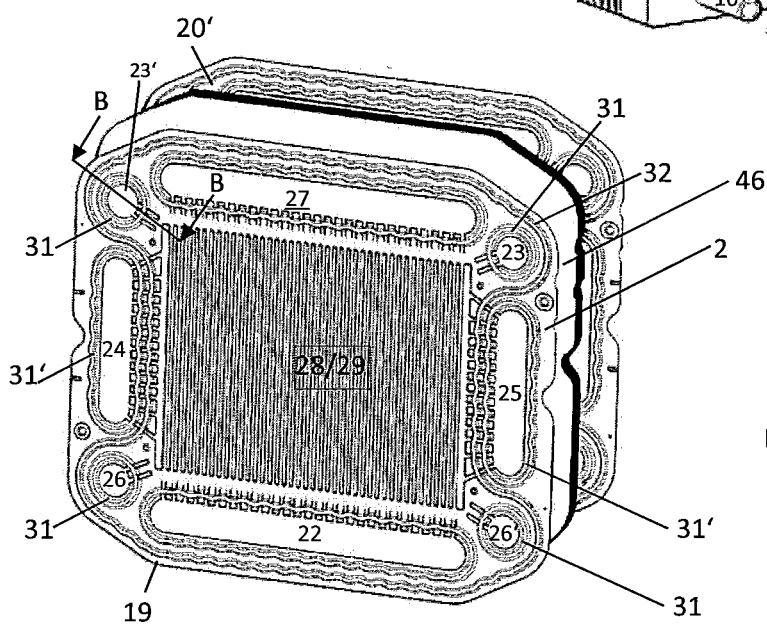
Fig. 2-a
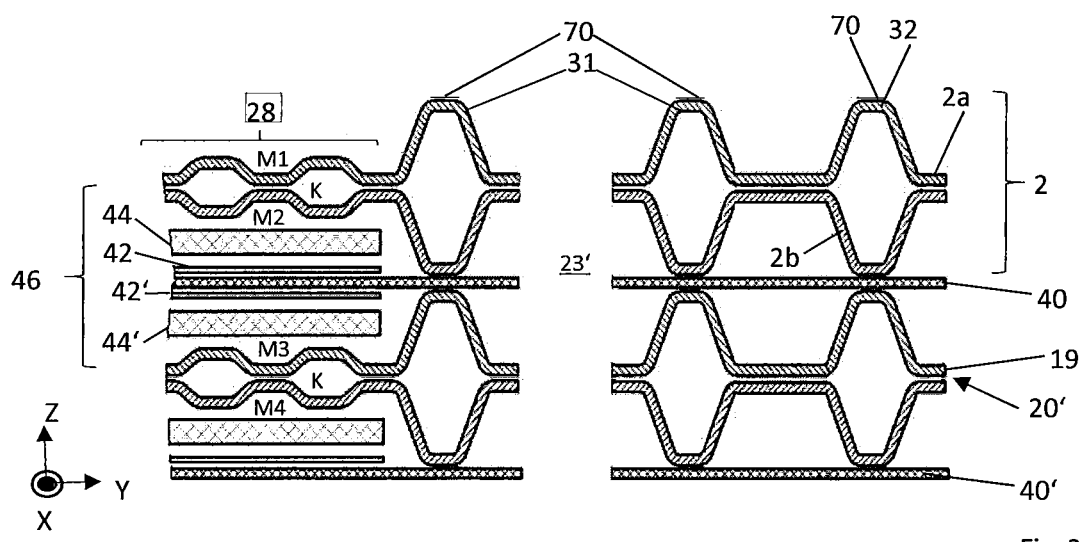
Fig. 2-b

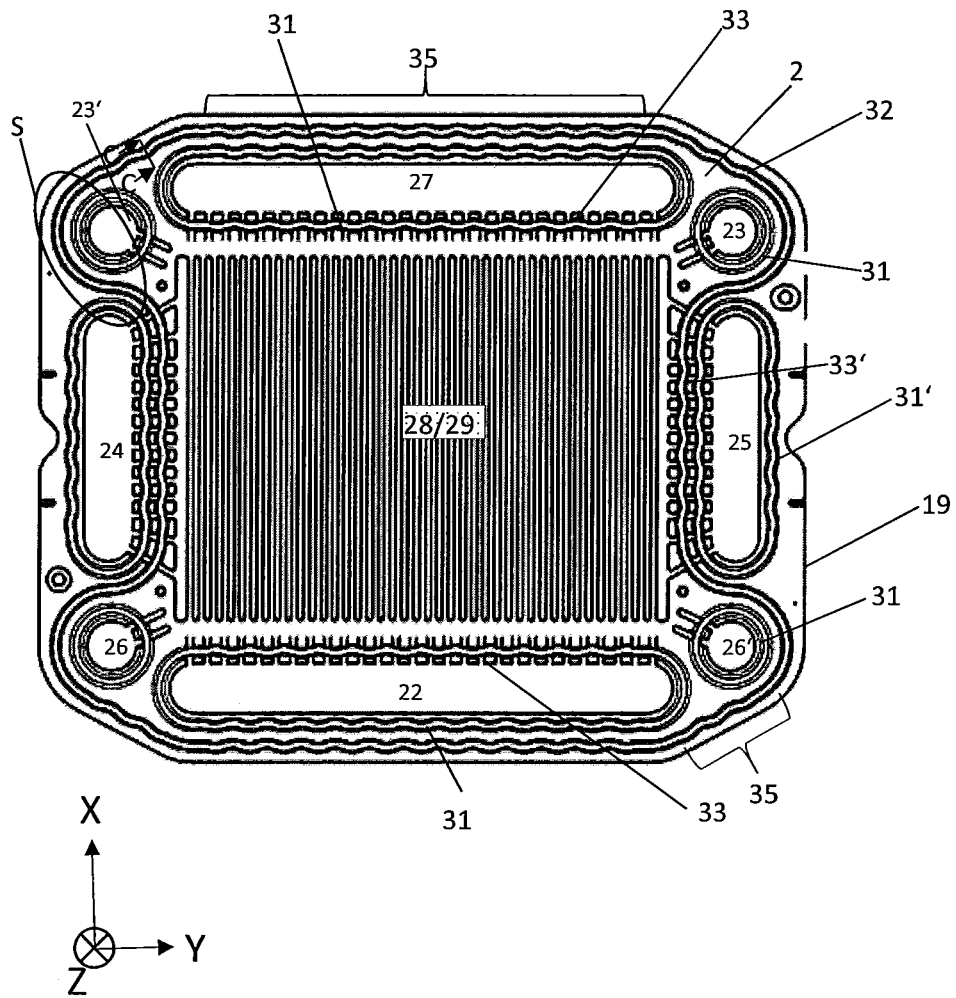
Fig. 2-c
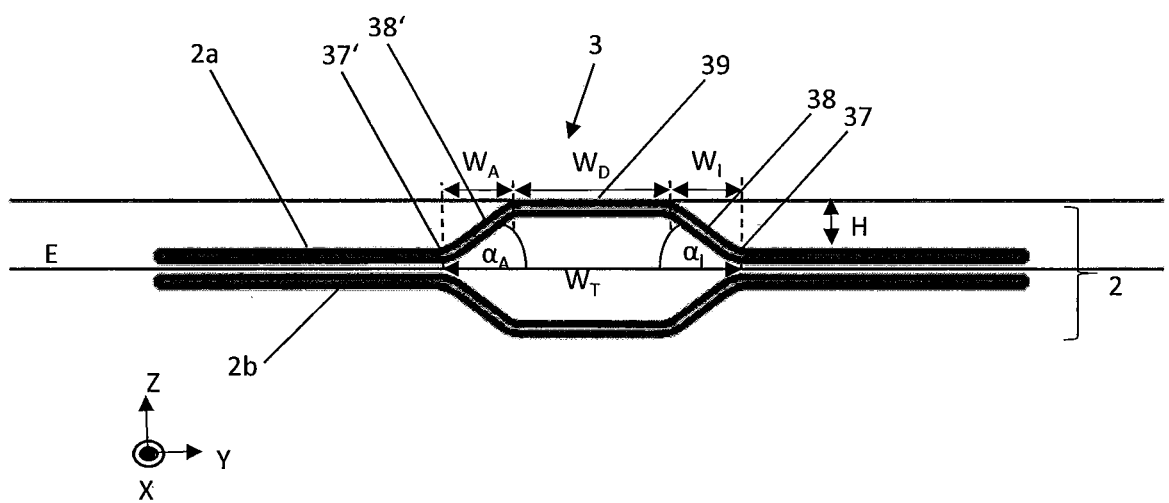
Fig. 3

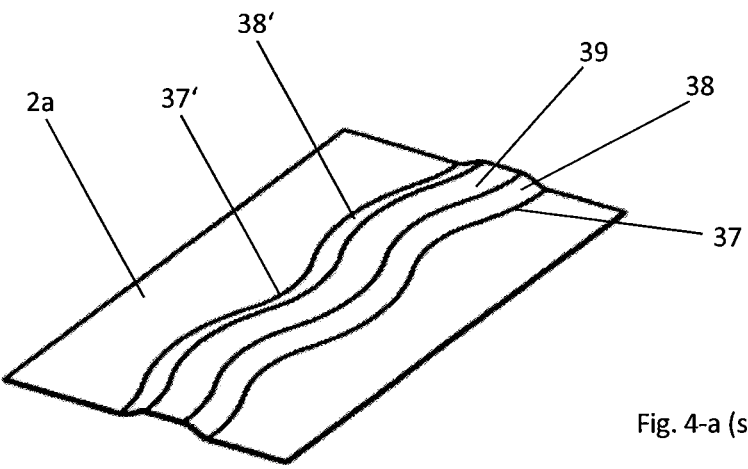
Fig. 4-a (state of the art)
Prior Art
Prior Art
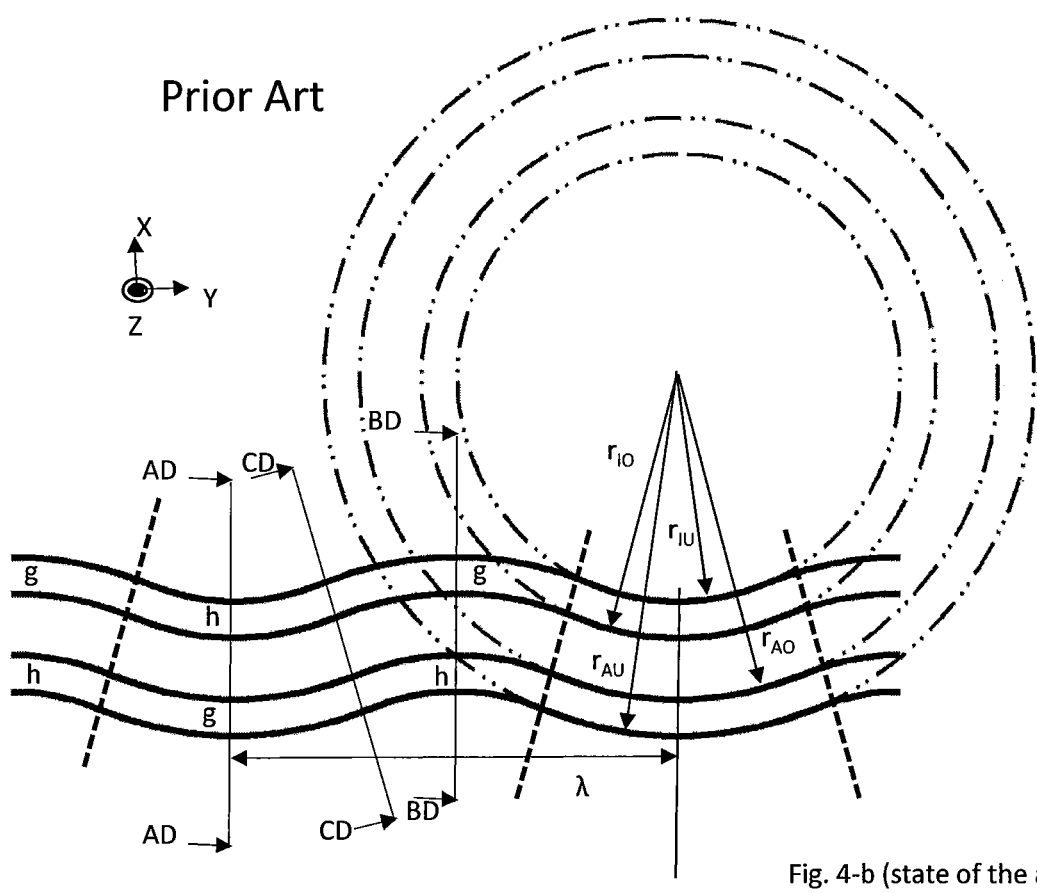
Fig. 4-b (state of the art)

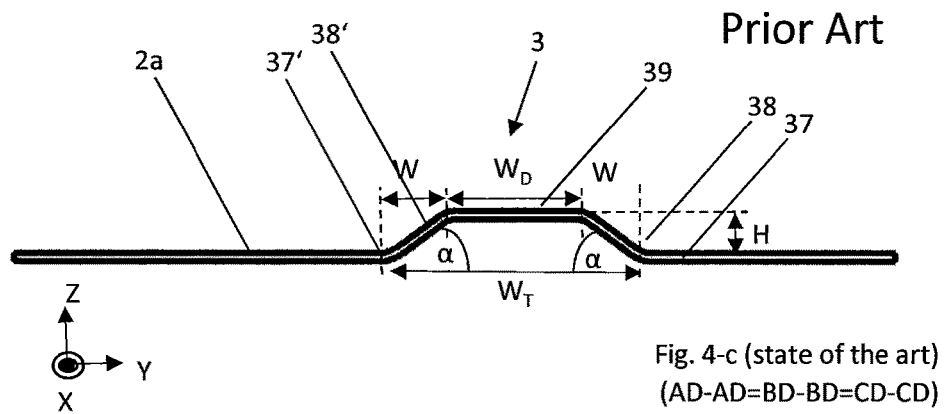
Fig. 4-c (state of the art)
(AD-AD=BD-BD=CD-CD)
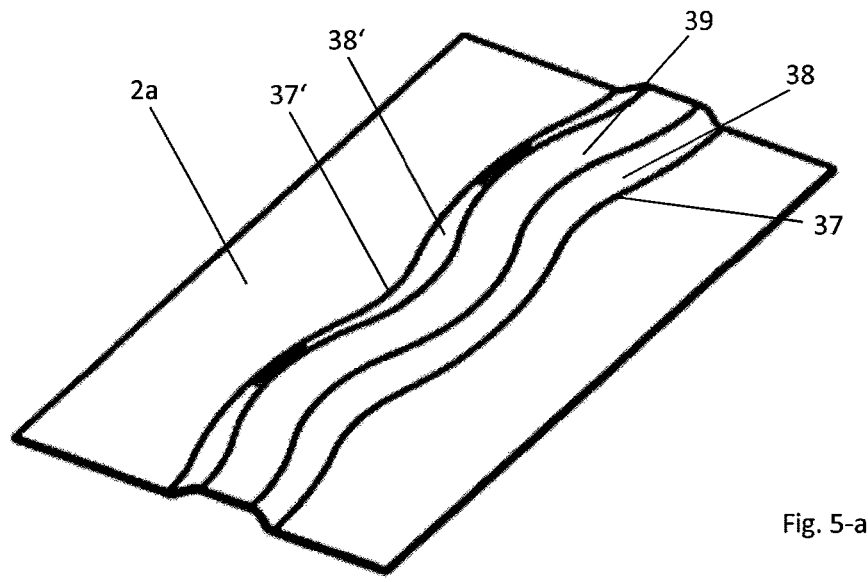
Fig. 5-a
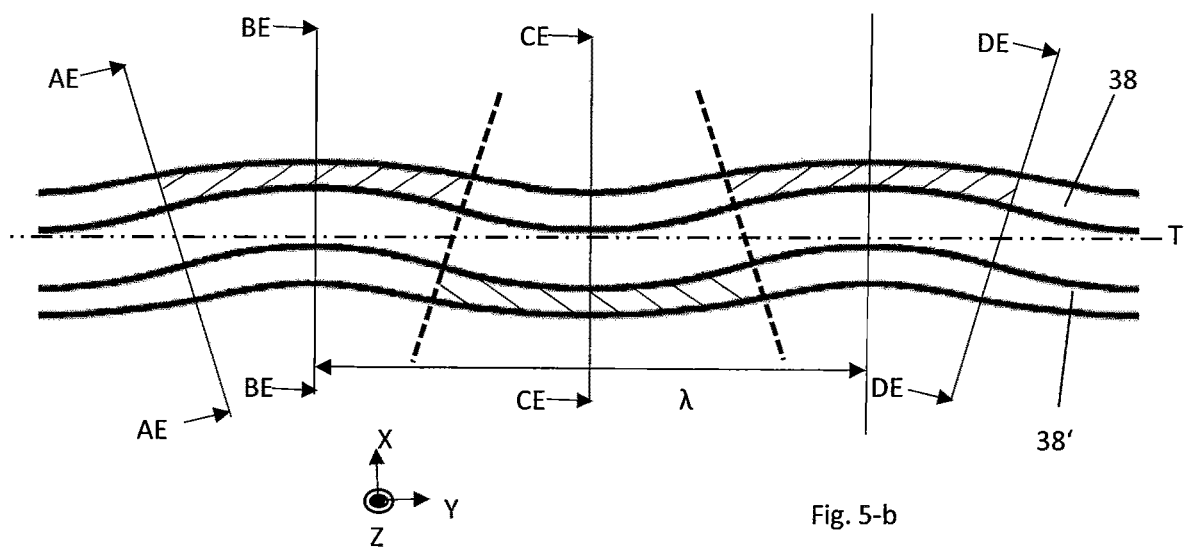
Fig. 5-b

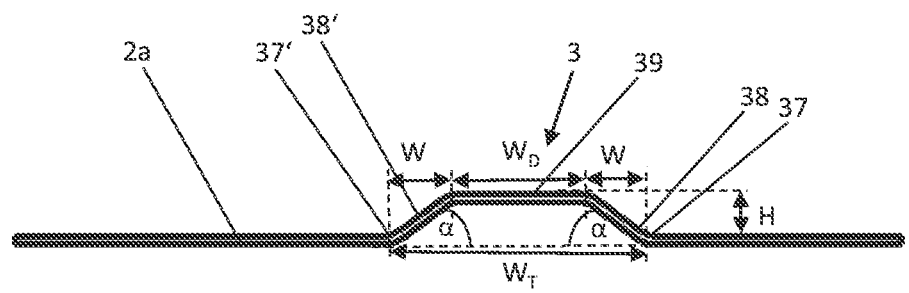
Fig 5-c (AE-AE = DE-DE)
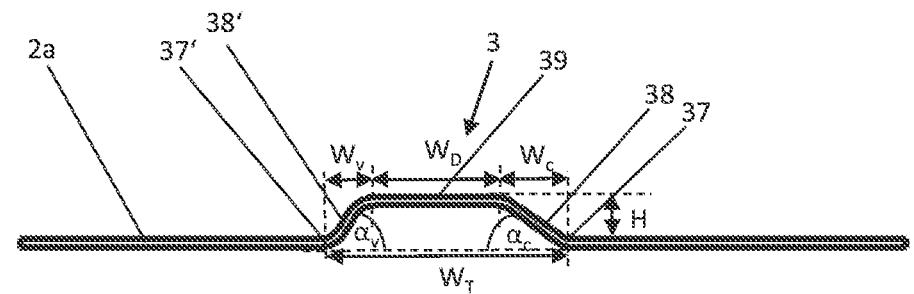
Fig. 5-d (BE-BE)
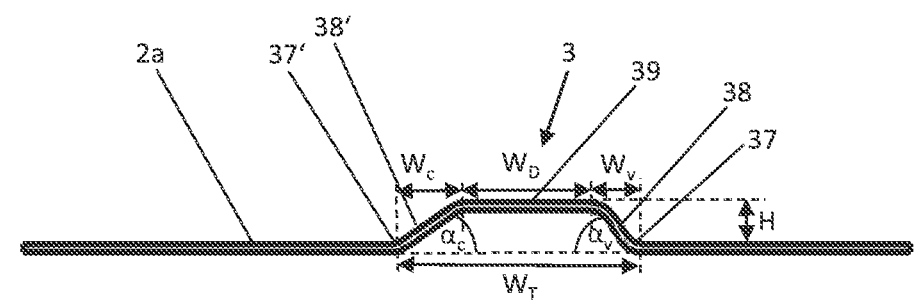
Fig. 5-e (CE – CE)

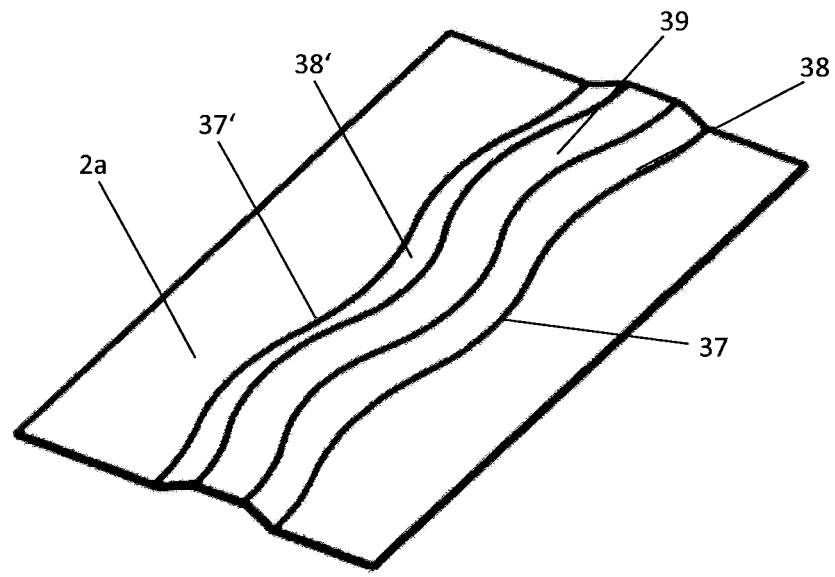
Fig. 6-a
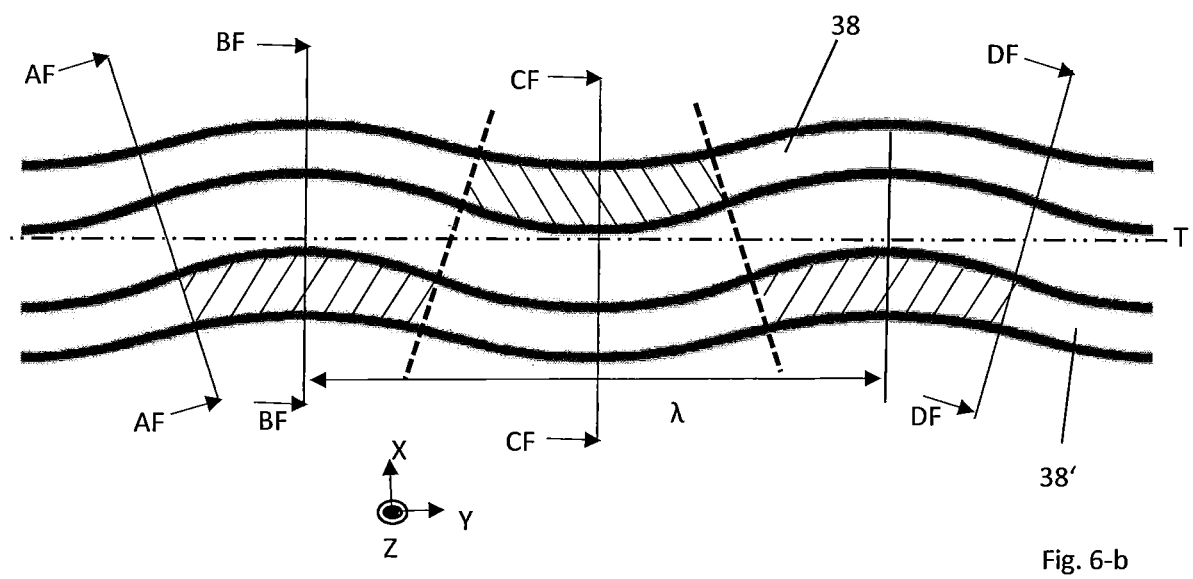
Fig. 6-b

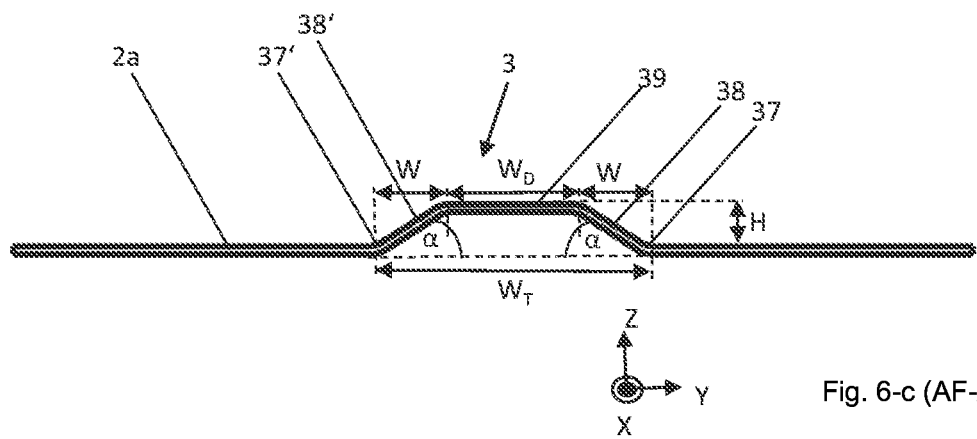
Fig. 6-c (AF-AF = DF-DF)
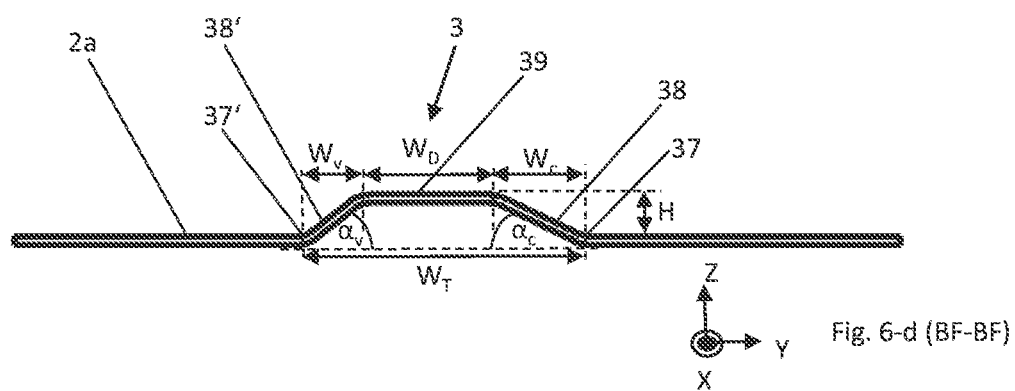
Fig. 6-d (BF-BF)
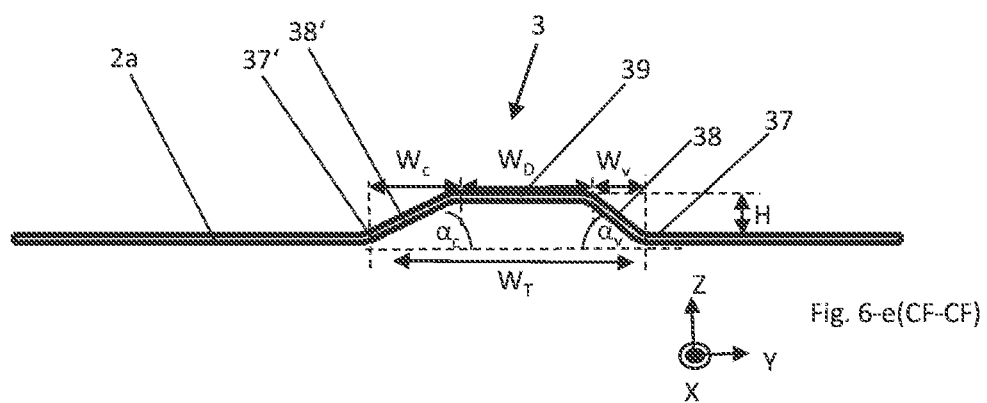
Fig. 6-e (CF-CF)

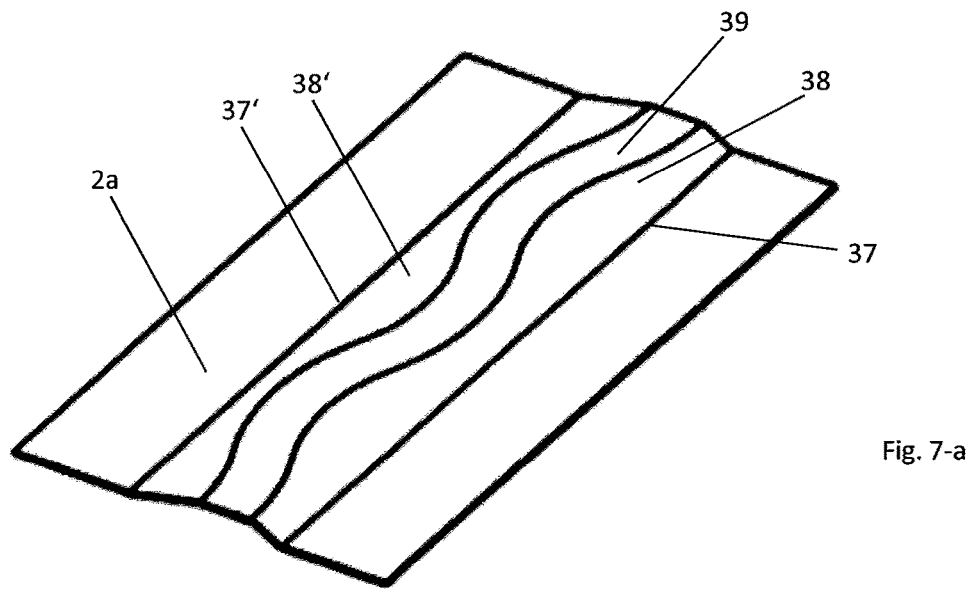
Fig. 7-a
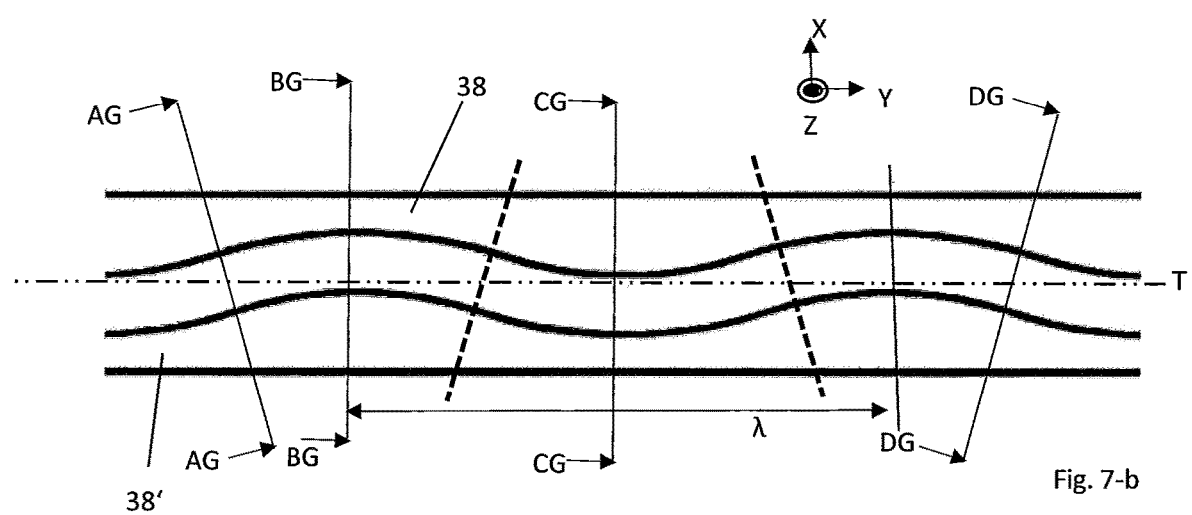
Fig. 7-b

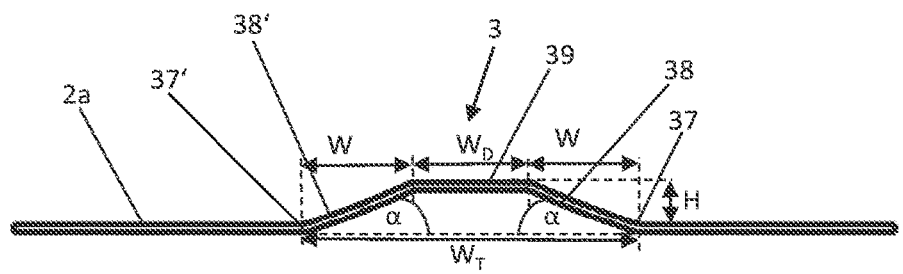
Fig. 7-c (AG-AG = DG-DG)
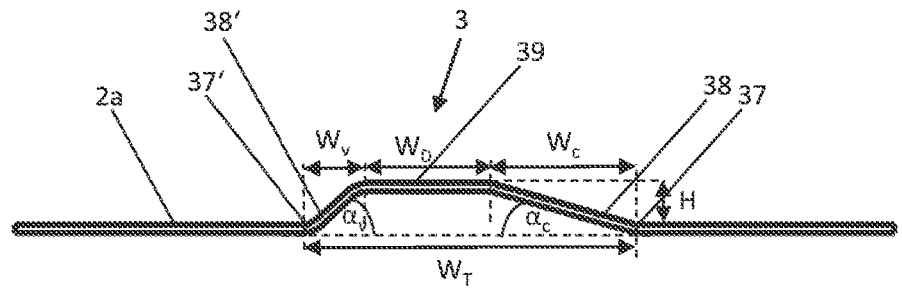
Fig. 7-d (BG-BG)
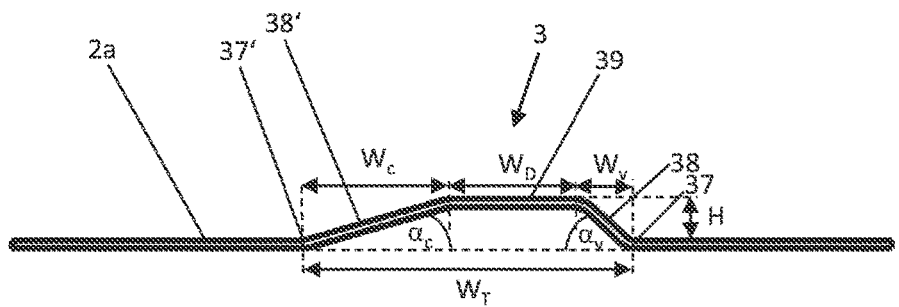
Fig. 7-e (CG-CG)

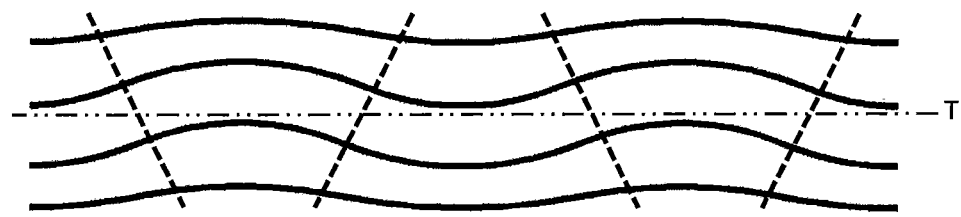
Fig. 8
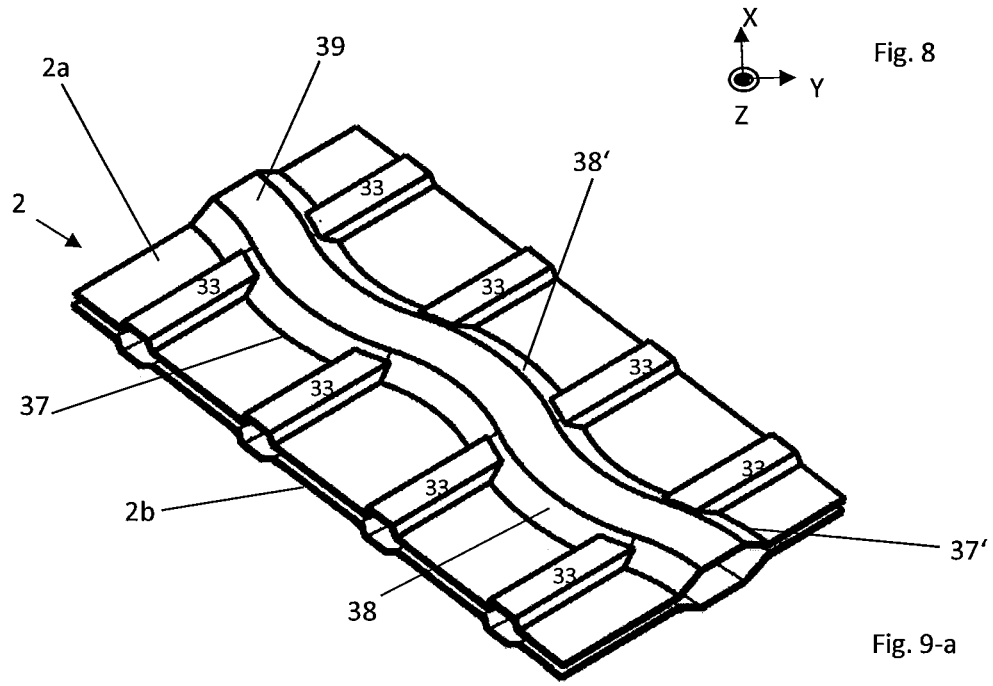
Fig. 9-a
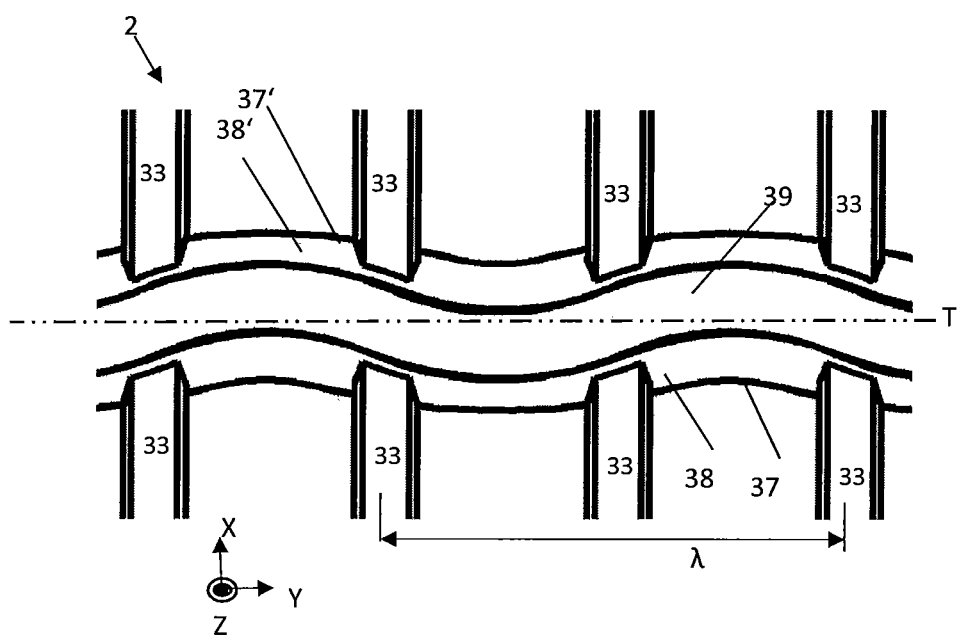
Fig. 9-b

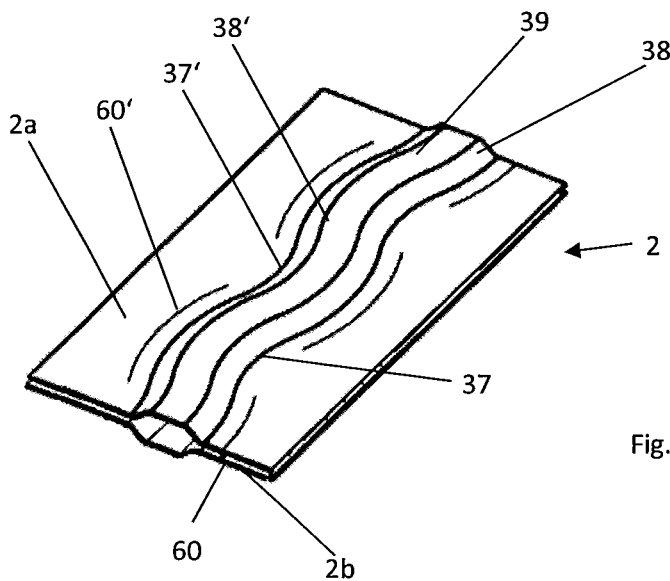
Fig. 11-a
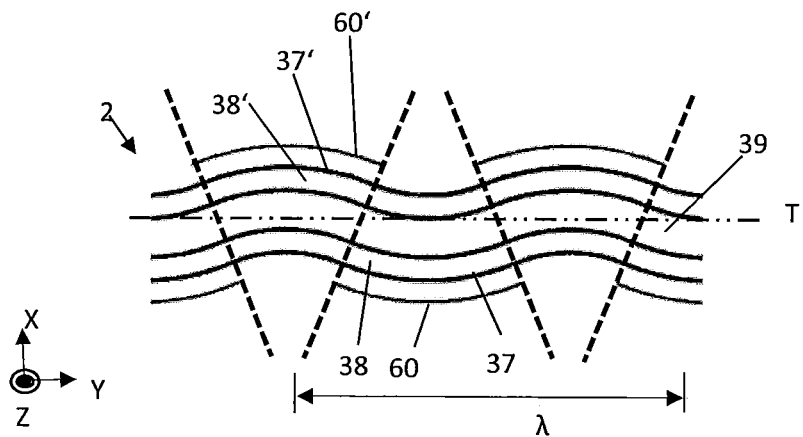
Fig. 11-b
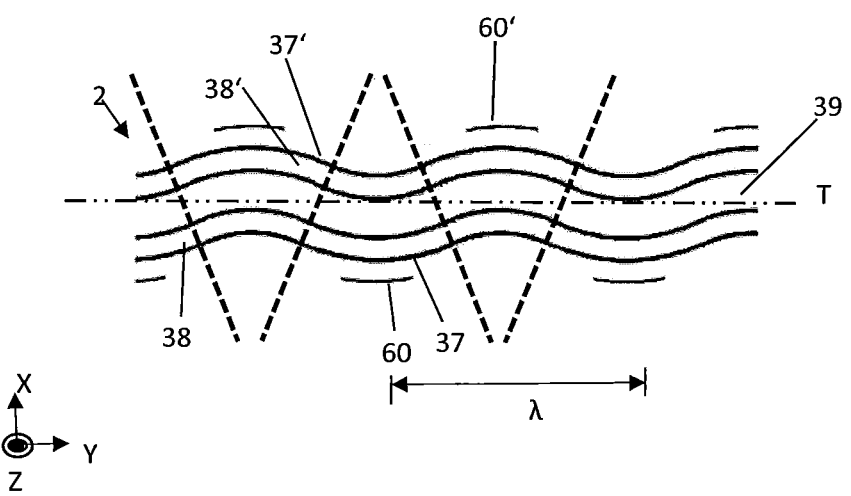
Fig. 12

SEPARATOR PLATE WITH DECREASED BASE WIDTH OF ONE BEAD FLANK AND ELECTROCHEMICAL SYSTEM

BACKGROUND OF THE INVENTION

The invention relates to a separator plate for an electrochemical system, as well as to such an electrochemical system.

The separator plate can be used for example for a fuel cell system in which electrical energy is obtained from hydrogen and oxygen. The separator plate can also be used for an electrolyser in which hydrogen and oxygen are produced from water by way of applying a potential. The separator plate can likewise be used for an electrochemical compressor in which molecular hydrogen is transported through the membrane due to oxidation/reduction by way of applying a potential, and is simultaneously compressed. Moreover, the separator plate can also be used for a humidifier for an electrochemical system in which a dry gas to be fed to an electrochemical system is humidified by way of a humid gas, mostly an exhaust gas of an electrochemical system.

Usually, separator plates for an electrochemical system comprise a plate pair with two metallic individual plates, wherein in each case two separator plates surround an electrochemical cell, for example a fuel cell, and delimit this from the next electrochemical cell. Herein, in an electrochemical system a multitude of electrochemical cells, for example up to 200, are mostly stacked in series into a stack, in a manner such that the cells are then each separated from one another by a separator plate. The cells themselves usually consist of a membrane electrode assembly/unit, also called MEA (membrane electrode assembly), as well as in each case of a gas diffusion layer (GDL) which e.g. consists of an electrically conductive carbon non-woven, on both sides of the MEA. The complete stack is held together between two end plates via a clamping system and is provided with a predefined pressing. In the case of a humidifier, the cell consists of only a membrane, potentially with a support medium, as well as with porous structures which can be compared to the GDLs, but which do not need to be electrically conductive.

In an electrochemical system, apart from separation of the electrochemical cells from one another, the separator plates serve further functions; these on the one hand being the electrical contacting of the electrodes of the different electrochemical cells, as well as the leading of the current to the respective adjacent cell, and on the other hand the supplying of the cells with operating media and the removal of the reaction products, furthermore the cooling of the electrochemical cells and the onward transport of the waste heat, as well as the sealing of the compartments of the two different operating media and of the coolant, to one another as well as to the outside.

Through-openings for operating media, usually on the one hand for hydrogen or methanol in particular and on the other hand for air or oxygen in particular, as well as for coolant, mostly mixtures of demineralised water and anti-freeze, are accordingly formed in both metallic individual plates of the separator plate, for the supply of the electrochemical cells. Operating media and coolant are hereinafter together referred to as media. Moreover, a distribution structure is formed in each of the two metallic individual plates, wherein channels form on both surfaces of the two individual plates. An operating medium is conducted on each of the outwardly facing surfaces of the separator plate, and the coolant is conducted in the intermediate space between the two metallic individual plates. The region in which an operating medium is led in a channel structure is also referred to as the electrochemically active region of the separator plate. Each of the distribution structures communicates with at least two of the through-openings, specifically at least one inlet and at least one outlet for the respective fluid. Each of the individual metallic plates, at least in a peripherally closed manner around the electrochemically active region of the separation plate as well as around the through-openings, is surrounded by a sealing structure, which is distanced from the electrochemically active region, or the respective edge of the through-opening, so as to seal the different media regions to one another and to the outside. The sealing of the electrochemically active region can herein be effected such that through-openings which are sealed with respect to the compartment containing the electrochemically active region by way of their own peripheral sealing structures, are arranged within the sealing structure which is peripherally closed around this region.

It has already been suggested in DE 101 58 772 A1 to emboss the sealing structure into the metallic individual plates of the separator structure, specifically in the form of a full bead or half bead extending in a straight line. A sealing result satisfying the expectations at the time could be achieved by these straight-lined beads in the case of small separator plates having an essentially square base surface and a small to medium plate number, with a simultaneously high clamping of the stack. However, with beads extending in a straight line in separator plates having rather elongate plate base surfaces, or in larger separator plates, the sealing result was already mostly unsatisfactory. With long bead sections running in a straight line, the beads lose their stiffness with an increasing distance to the corner points and do not have an adequate restoring force in the regions concerned.

In WO 2004/036677 A2, an attempt to counter this was made by way of the sealing elements being designed as full beads with a non-linear course at least in sections. These on the one hand are beads which become thicker and thinner at both sides in a periodically alternating manner, as well as on the other hand beads which have an overall wave-like course in sections. Herein, the base widths of the bead flanks—measured at right angles to the respective neutral line of the wave-like bead—remain the same over the course of the flanks in the wave-like sections. Consequently, different inner and outer radii, which have different stiffnesses and resiliences form, particularly in the region of the wave peaks and wave troughs, i.e. the apexes. In each case, alternating homogeneities of the pressing in the contact region of the bead roof which, with respect to bead flanks lying opposite one another, change in a manner opposed to one another, result along both bead flanks on account of this. Here, the risk exists of media flowing through the sealing structure in regions of lower bead stiffness, which is to say of operating media flowing into the interior of the separator plate and of coolant flowing into the outer space of the separator plate. On the one hand, the respective media are lost for the operation of the electrochemical system. This is not acceptable with regard to the efficiency of the electrochemical system. On the other hand, the risk exists of coolant getting into the region of the operating media and for example damaging the membrane there.

Due to the large number of separator plates in a stack, a small difference in the stiffness and resilience of the sealing bead along its course in a single separator plate or in a single metallic individual plate of a separator plate leads to a very large difference in the resiliency of the sealing beads connected/arranged in series, so that small differences at the individual separator plates have a significant effect on the sealedness of the complete stack.

SUMMARY OF THE INVENTION

It is therefore the object of the invention to specify a separator plate which permits a uniform sealing of an electrochemical cell, without significantly more construction space than is necessary for sealing arrangements of the state of the art being required for the sealing. The costs for the separator plate should remain comparable to the costs of a separator plate of the state of the art, so that the costs of the manufacturing method as well as the material expense should only be increased insignificantly at the most. The sealing should be able to be applied for sealing systems without branching and continuations as well as for those with branching and/or continuations.

This object is achieved by a separator plate according to claims 1 and 18 as well as by an electrochemical system according to claim 22. Further developments can be gleaned from the dependent claims.

Thus, the invention relates, one the one hand, to a separator plate for an electrochemical system with two metallic individual plates. The metallic individual plates each comprise through-openings for operating media and, as the case may be, for coolant, as well as distribution structures which are formed into the metallic individual plates and which each communicate with at least two of the through-openings. A peripheral sealing structure is formed into each of the metallic individual plates, at least peripherally around the electrochemically active region and distanced from this and/or peripherally around at least one of the through-openings and distanced from the edge of these through-openings, the cross section of said sealing structure comprising a bead roof, two bead flanks and, at least in sections, two bead feet. Herein, delimitation lines form on the bead roof at both sides, wherein these lines delimit the bead roof running parallel to the plate plane, to the bead flanks inclined to this plane, including a mostly present transition radius. Herein, what is essential is that the sealing structure at least in the region of its bead roof and at least in sections runs in a wave-like manner with at least two wave periods with convex and concave sections, so that upper inner and outer radii form at the transition from the bead roof to the bead flanks and lower inner and outer radii form at the bead feet. What is different to the state of the art is the fact that although the width ($W_D$) of the bead roof is constant in the region of its wave-like extension, the base width ($W_I$, $W_A$) of at least one of the two bead flanks however changes. By way of this, it is ensured that the complete sealing structure not only has a uniform sealing behaviour in its potentially present linear regions, but also has a uniform sealing behaviour/uniform stiffness in the region of the wave-like course of the bead roof at least along a transition from the bead roof to the respective bead flank.

The convex and the concave sections of the wave-like course merge into one another in each case at an inflection point. A main extension direction is superimposed on the wave shape of the bead roof. This main extension direction results from the connection line of the inflection points of the neutral lines of the bead roof. A convex section thus reaches from one inflection point which is to say from a perpendicular to the tangent to the neutral lines of the bead roof at its inflection point, over an apex projecting to a greater extent from the main extension direction of the bead, to the next inflection point, and a convex section reaches from an inflection point which is to say from a perpendicular to the tangent to the neutral lines of the bead roof at its inflection point, over an apex projecting to a lesser extent from the main extension direction of the bead, to the next inflection point. For the complete sealing structure, reference is always made to the respective perpendicular to the tangent at the respective point of the neutral lines.

The amplitudes of the delimitation lines of the bead roof can differ from the amplitudes of the lines of the course of the bead feet, whereas the wavelengths are identical.

The above also applies to the advantageous embodiment in which at least one of the bead flanks comprises continuations in the region of the wave-like course of the bead roof, said continuations comprising a roof, two flanks and two feet, wherein these continuations are designed such that the total height of the continuations is smaller than the total height of the sealing structure, so that the continuations do not affect or compromise the actual sealing line, or only to a small extent. These continuations on the one hand can serve for permitting a passage of a medium transverse to a sealing line. The continuations are preferably provided on both sealing flanks for this purpose. However, it is also possible to provide continuations at one side, and these form, on the surface of the individual plate beyond which surface the bead roof projects, a barrier between a distribution structure and the sealing structure in order to thus optimally guide the flow of operating medium or coolant. It is preferable for at least one of these continuations to connect the interior of the sealing structure to one of the distribution structures or to one of the through-openings for operating media or coolant, irrespective of whether a continuation serves for a passage of a medium or as a barrier. Apart from this, continuations can also serve exclusively as support structures or stiffening structures, and they herein mostly only have a length which is smaller than fivefold the width of the bead roof.

The arrangement of the continuations is herein advantageously effected such that the distance of at least two continuations to one another, preferably all continuations to one another, at a bead flank is $n \times \lambda/2$, wherein $\lambda$ is the period length of the wave shape of the bead roof and n is a natural number. The continuations thus for example can be present on each wave trough and/or each wave peak, of the section of the sealing structure in which the bead roof has a wave-like course. However, they can also be arranged at the inflection points of the wave structure. The number of continuations is directed to the respective application purpose and the total length, i.e. the number of wave periods of the wave-like region of the bead roof.

For a uniform sealing, it is advantageous if the base width ($W_I$, $W_A$) of at least one of the bead flanks continuously changes, since abrupt changes would counteract a uniform sealing.

It is also advantageous for uniform sealing if additionally to the already described change of the base width of at least one bead flank, the sealing system of the separator plate also has changes of the flank angle in the region of the wave-like extension of the bead roof. Here, the flank angle ($\alpha_I$) between the bead roof and a bead flank extending in a concave section, and the flank angle ($\alpha_A$) between the bead roof and the opposite bead flank extending in a convex section, change along the wave-like extension region to a different extent, at least in sections.

Moreover, with regard to the manufacture of the separator plate, it is particularly advantageous if the lower outer radius in a cross section through the sealing structure is the same or larger than the upper outer radius. The cross section of the bead in the context of this invention is always defined perpendicularly to the neutral lines of the bead roof.

Particularly with regard to a uniform sealing of a plate stack comprising many separator plates, it is particularly advantageous if the bead roofs of the sealing structures of the two metallic individual plates of the separator plate have a mirror-symmetrical course to one another with respect to their contact surface. A precise propagation of the sealing lines through the complete plate stack is thus achieved given a sufficient width of the bead roof, even with slight inaccuracies of the placing of individual separator plates in the plate stack. The mirror symmetry first and foremost relates to the course of the bead roofs of the sealing structures, but it can also relate to the complete sealing structures, wherein it is the potentially present sealing structures without continuations which are meant here. The height of the sealing structures can moreover also be essentially identical in both metallic individual plates of the separator plate. A particularly uniform pressing and sealing is achieved by way of this, due to the fact that the spring force of the beads is identical in both individual plates.

The sealing structure of the separator plate preferably not only runs with a wave-like bead roof in a single, continuous section, but in contrast, for an optimal sealing, it is advantageous if several sections of the bead roof which are connected over the course of the bead but are spatially separated (i.e. e.g. arranged at another location of the plate) each extend in a wave-like manner. Generally, it is possible for the different sections of the wave-like extension to have different wavelengths and/or amplitudes, but it is preferable if at least all roof sections of a continuous bead, preferably even all beads which have a wave-like course of the bead roof, have the same wavelengths and amplitudes.

Here, on the one hand it is advantageous if, given a peripheral sealing structure in which several sections of the bead roof extend peripherally in a closed manner around the electrochemically active region in a wave-like manner with at least two wave periods, at least two wave-like sections extend along sides of the electrochemically active region of the individual plate, said sides lying opposite one another. The wave-like sections can also extend in sections along all sides of the electrochemically active region.

On the other hand, it can be advantageous if, given a peripheral sealing structure in which several sections of the bead roof extend in a wave-like manner with at least two wave periods along an inner edge, that is to say the edge of at least one through-opening for operating media or coolant, of a metallic individual plate, at least two wave-like sections extend along inner edges of the through-opening which lie opposite one another. Here too, it is basically possible for beads with a wave-like bead roof to run sectionally on all inner edges.

Basically, it is advantageous if the wave-like sections of the bead roof extend in those sections of the sealing structure in which the sealing structure, considered macroscopically, i.e. with regard to its main extension direction, has a straight-lined course or a weakly arcuate course with a radius>15 mm.

The width of the bead roof at least in a section of the wave-like course of the bead roof is between 0.2 and 2 mm, preferably between 0.9 and 1.2 mm. Generally, the width of the bead roof likewise lies in the mentioned regions in the further linear or arcuate course.

The bead sections with the wave-like course of the bead roof, apart from a change of the base width of at least one bead flank, also have a change of the flank angle of the respective bead flank(s). If one considers a convex section of the bead roof, then the adjacent flank angle, beginning at a cross section perpendicular to the tangent through the inflection point of the neutral lines, increases up to a cross section perpendicular to the tangent through the apex of the convex section of the neutral lines of the bead roof and then decreases again up to the cross section perpendicular to the tangent through the next inflection point of the neutral lines. Accordingly, the flank angle of a concave section, beginning at a cross section perpendicular to the tangent through the inflection point of the natural lines, firstly increases up to a cross section perpendicular to the tangent through the apex of the concave section of the neutral lines of the bead roof, thus of the minimum, and then increases again up to the cross section perpendicular to the tangent through the next inflection point of the neutral lines. Advantageously, the changes run in a continuous manner. Basically, it is advantageous if the flank angle of a concave section is smaller than the flank angle of a convex section. The flank angle of a concave section generally lies between 15° and 60°, preferably between 25° and 50°, whereas the flank angle of a convex section generally lies between 20° and 65°, preferably between 30° and 55°. The regions are herein defined in each case including or excluding the mentioned limits. On account of this, the solution according to the invention differs significantly from the state of the art, where the flank angle remains unchanged over the course of the bead.

The change of the flank angle in a concave section between the inflection point and the apex point herein corresponds to a reduction of up to 50%, preferably of up to 40% with respect to the value at the inflection point, and the change of the flank angle in a convex section between thee inflection point and the apex point corresponds to an increase by up to 120%, preferably up to 100%, particularly preferably by up to 70%, with respect to the value at the inflection point.

The base width of the bead along one of its sections, in which the bead roof runs in a wave-like manner, can only change at one bead flank, but in one embodiment can change at both bead flanks. If it changes at only one bead flank, then the change at this flank, if the change is effected in a convex section, that is in the case of a reduction, is at least 5%, preferably at least 25% with respect to the base width at a cross section perpendicular to the tangent on one of the adjacent inflection points, and if it is effected at in a concave section, that is in the case of an increase, the change is at least 5%, preferably at least 20% with respect to the basis width at a cross section perpendicular to a tangent on one of the adjacent inflection points.

If the base width of both bead flanks changes, then the change is between 5 and 70%, preferably between 30 and 55%, with respect to the base width at a cross section perpendicular to the tangent on one of the adjacent inflection points.

In an advantageous embodiment of the separator plate according to the invention, the total width of the sealing structure from bead foot to bead foot is constant in the region of a wave-like extension of the bead roof, so that the base widths of the two bead flanks therefore always change in a complementary manner. In a particularly advantageous embodiment, the sealing structure as a whole runs linearly in the region of the wave-like extension of the bead roof. Here, the spatial equipment for the sealing structure is particularly modest.

The invention on the other hand relates to a separator plate for an electrochemical system comprising two metallic individual plates which each comprise through-openings for operating media and, as the case may be, coolant, as well as distribution structures which are formed into the metallic individual plates and which each communicate with at least two of the through-openings. Herein, a peripheral sealing structure is formed into each of the metallic individual plates, at least peripherally around the electrochemically active region and distanced from this and/or peripherally around at least one of the through-openings and distanced from its edge, the cross section of said sealing structure comprising a bead roof, two bead flanks and at least in sections two bead feet. Here too, the sealing structure at least in the region of its bead roof at least in sections extends in a wave-like manner with at least two wave periods with convex and concave sections. Here too, upper inner and outer radii form at the transition from the bead roof to the bead flanks, and lower inner and outer radii at the bead feet. This embodiment of the invention is characterised in that at least at one side adjacent to the bead feet, at least along the region in which the bead roof extends in a wave-like manner, weld connections are sectionally provided between the two metallic individual plates of the separator plate, wherein the weld connections in each case extend in the region adjacent to a convex region of the wave course and preferably essentially concentrically to the lower outer radius. The distance to the bead foot herein preferably corresponds to maximally double, in particular maximally to single the width of the bead roof. Here, the flat sections adjacent to the bead foot which, which without further measures tend to diverge on account of the low spring stiffness, are connected to one another and the complete separator plate thus obtains more structural rigidity. On the other hand, the welding is effected in precisely the regions in which the structural rigidity is to be increased, whereas the regions of sufficient structural rigidity or stiffness along the bead feet remain free of weld connections.

In this embodiment of the invention too, one of the bead flanks, in the region of the wave-like course of the bead roof, can comprise continuations having a roof, two flanks and two feet, wherein these continuations are designed such that the total height of the continuations is smaller than the total height of the sealing structure. What has been specified before with respect to the continuations applies here to the same extent.

As already specified, the weld connections only extend in sections. Here, it is preferable if their extension in each case is at least ⅙ of the wavelength of the wave-like course of the bead roof. Furthermore, it is preferable if the extension of the weld connection extends maximally over the entire convex region of the wave course, thus between the perpendiculars through the inflection points of the neutral lines of the bead roof, said inflection points being adjacent one another.

In all embodiments of the invention, it is advantageous if the sealing structure of an individual plate has a constant height, and it is only the potentially present continuations which are excluded. It is particularly preferable if all individual plates comprise sealing structures with a constant height.

It is advantageous for all aforesaid embodiments of the separator plate according to the invention if the sealing structure comprises a coating for micro-sealing, at least in the region of the bead roof. The coating herein is deposited for example on at least one, preferably however on both individual plates, on the bead roof in a manner such that it is located on the outer side of the separator plate. The coating herein as a binder advantageously comprises FPM (fluorocarbon rubber), silicone rubber or NBR rubber (nitrile butadiene rubber), PUR (polyurethane), NR (natural rubber), FFKM (perfluoroelastomeric compounds), SBR (styrene butadiene rubber), BR (butyl rubber), FVSQ (fluorosilicone), CSM (chlorosulphonated polyethylene), silicon resin and/or epoxy resin or mixtures of the mentioned substances. The coating can also be a contact adhesive or a physically setting adhesive. This for example can be a permanently sticky adhesive which preferably consists of mixtures of rubbers and adhesive resins, so called tackifiers, or of a poorly cured rubber, where synthetic and natural resins may be considered as adhesive resins. Herein, natural and synthetic rubbers, polyacrylates, polyester, polychloroprenes, polyvinylether and/or polyurethanes and/or flouropolymer rubbers can be used as base polymers, to which resins such as in particular modified natural resins, for example rosin and/or artificial resins—for example polyester resins, phenol resins—as well as softeners and/or antioxidants can be added. Typically, coating thicknesses for all aforesaid substances are between 5 and 200 micrometers.

The metallic layers of the separator plates preferably consist of steel, in particular of stainless steel, wherein conductive coatings can be present in the electrochemically active region. In alternative embodiments, aluminium, titanium, roller-coated, low-alloyed steels which are coated e.g. with chromium, stainless steel, niobium, tantalum or chromium-nickel alloys can be used as materials. Common sheet metal thicknesses lie between 50 and 200 micrometers, preferably between 60 and 150 micrometers.

Generally, with regard to the separator plates, one can differentiate between the bipolar plates, where different media are led on both surfaces, and monopolar plates, where the same medium is led on both surfaces of a monopolar plate. Here, slightly different monopolar plates are mostly used for both different media. The differences in particular may relate to the presence of continuations on the sealing beads. The course of the sealing structures and thus their sectionally wave-like design in contrast is mostly identical or mirror symmetrical in all plates. The embodiments of this description apply to both plate types, unless the differences are emphasised by explicit mention. Preferably, coolant is led in the intermediate space of the two individual plates of the respective plate, and this is the case with both plate types.

The separator plates according to the invention are advantageously used in an electrochemical system. Such an electrochemical system comprises two end plates, as well as a multitude of electrochemical cells which are separated from one another in each case by a separator plate according to the invention. The complete system is herein preferably held together by way of clamping means, for example bolts or straps and herein provided with a clamping force which is optimal for sealing. Transition plates whose design differs from the design of the separator plates of the stack can be provided between the end plates and the outermost cells of the stack. Mostly, one such transition plate, which can also be designed in a multi-layered manner, is present per end plate.

With regard to the electrochemical system, this is preferably a fuel cell system, an electrolyser, an electrochemical compressor system or a humidifier system for a fuel cell system.

The invention is hereinafter explained in more detail by way of the drawings. These drawings serve exclusively for explaining preferred embodiment examples of the invention, without the invention being limited to this. In the drawings, the same parts are provided with the same reference numerals. The examples all relate to a fuel cell system, but the explanations also apply to the same extent to the other types of electrochemical systems which are mentioned above. Apart from the essential features of the present invention which are specified in the independent claims, the figures also contain optional further developments which would also be advantageous in a different composition. Each individual one of these advantageous and/or optional further developments of the invention as such can be formed into a further development of the invention specified in the independent claims, even without combining it with one, several or all of the optional and/or advantageous further developments which are also represented in the examples.

BRIEF DESCRIPTION OF THE DRAWINGS

The figures schematically show:
FIG. 1 a schematic representation of an electrochemical system;
FIG. 2a is an exploded representation of an electrochemical cell with two separator plates which are adjacent thereto;
FIG. 2b is a partial cross-section of the electrochemical cell and a separator plate both of FIG. 2a;
FIG. 2c is a plan view of a separator plate of FIG. 2a;
FIG. 3 a sectioned representation of a sealing system of a separator plate;
FIG. 4a is a perspective view of a sealing system of a separator plate according to the state of the art;
FIG. 4b is a schematic view of the sealing system of the separator plate in FIG. 4a;
FIG. 4c is a partial cross-section of the sealing system of the separator plate in FIG. 4b;
FIG. 5a is a perspective view of a sealing system of a separator plate;
FIG. 5b is a schematic view of the sealing system of the separator plate in FIG. 5a;
FIG. 5c is a partial cross-section of one embodiment of a sealing system of the separator plate in FIG. 5b;
FIG. 5d is a partial cross-section of another embodiment of a sealing system of the separator plate in FIG. 5b;
FIG. 5e is a partial cross-section of another embodiment of a sealing system of the separator plate in FIG. 5b;
FIG. 6a is a perspective view of a sealing system of a separator plate;
FIG. 6b is a schematic view of the sealing system of the separator plate in FIG. 6a;
FIG. 6c is a partial cross-section of one embodiment of a sealing system of the separator plate in FIG. 6b;
FIG. 6d is a partial cross-section of another embodiment of a sealing system of the separator plate in FIG. 6b;
FIG. 6e is a partial cross-section of another embodiment of a sealing system of the separator plate in FIG. 6b;
FIG. 7a is a perspective view of a sealing system of a separator plate;
FIG. 7b is a schematic view of the sealing system of the separator plate in FIG. 7a;
FIG. 7c is a partial cross-section of one embodiment of a sealing system of the separator plate in FIG. 7b;
FIG. 7d is a partial cross-section of another embodiment of a sealing system of the separator plate in FIG. 7b;
FIG. 7e is a partial cross-section of another embodiment of a sealing system of the separator plate in FIG. 7b;
FIG. 8 a plan view of a detail of a sealing system of a further separator plate according to the invention;
FIG. 9a is an oblique view of a detail of yet another embodiment of a sealing system with feed-throughs through the sealing system;
FIG. 9b is a plan view of the sealing system with feed-throughs in FIG. 9a;
FIG. 11a is an oblique view of a detail of a sealing system of a further separator plate according to the invention;
FIG. 11b is a plan view of the sealing system of the separator plate of FIG. 11a;
FIG. 12 a plan view of a detail of a sealing system of a further separator plate according to the invention.

DETAILED DESCRIPTION OF THE INVENTION

Figure 10A:
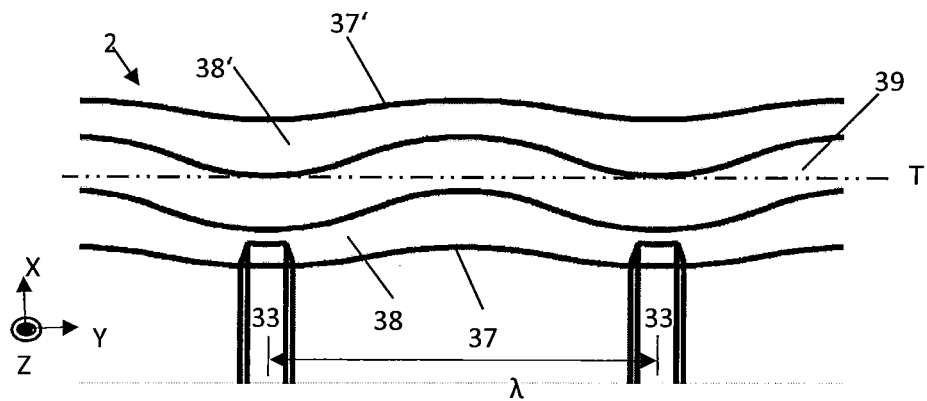
FIG. 10a is a plan view of a detail of a sealing system of a further separator plate according to the invention with delimination elements which are adjacent to the sealing system.

FIG. 1 represents an electrochemical system 1 with a multitude of cells 46 and separator plates 2 which are stacked in an alternating manner, as well as two end plates 11, 11' which delimit the stack. The end plate facing the viewer comprises six branches 12 to 17, which serve for the feed and discharge of reaction media and coolant: 12 indicates the feed branch for air, 17 the discharge branch for oxygen-depleted air, 13 the feed branch for hydrogen, 16 the discharge branch for hydrogen which has not been consumed, 15 the feed branch for coolant and 14 the discharge branch for heated coolant. One can thus differentiate between six media flows: A indicates oxygen-rich which is to say fresh air; D oxygen-depleted air, B hydrogen, C non-consumed hydrogen, E cool coolant and F heated coolant.

FIG. 2-a shows a cell 46 of an electrochemical system 1, here a fuel cell system 1 together with the two separator plates 2 and 2' which delimit the cell 46. The view is essentially in the z-direction of the coordinate system given in FIG. 1. The electrochemical system 1 of FIG. 2-a differs from that of FIG. 1 to the extent that the reduction agent, specifically the hydrogen, is not led through the stack via a port perpendicular to the plate plane, but via the two ports 23, 23' located in the upper corners. Conducting the non-consumed hydrogen gas onward in the stack direction is effected via the two ports 26, 26' located in the lower corners. The two lateral ports 24, 25 serve for the leading of coolant through the stack perpendicularly to the plane of the plate. The upper port 27 serves for leading oxygen-rich air through the stack, and the lower port 22 for leading oxygen-deficient poor air through the stack. The layer 2a of the separator plate 2 which lies at the top comprises a sealing structure consisting of several beads. A bead 32 which is peripheral around the electrochemically active region 29 and which in sections is peripheral along the outer edge 19 serves for sealing the electrochemically active region 29 or of the compartment enclosing this region, as well as the plate as a whole, to the outside. Moreover, each of the ports 22 to 27 comprises a separate bead 31, 31' surrounding the respective port. It is to be emphasised that the ports 23, 23', 26, 26' and 27 for the reaction media together with the beads 31 surrounding them lie within the region which is surrounded by the bead 32. The surface of the separator plate 2 which faces the viewer moreover comprises a channel structure 28, here for the distribution or air, and simultaneously forms the electrochemically active surface 29. The bead 32 thus surrounds the electrochemically active surface 29 in a peripheral and distanced manner, wherein the distance changes in the course. The feed of air from the port 27 to the channel structure 28 and the discharge of depleted air from the channel structure 28 to the port 22 is explained in more detail by way of FIG. 2-c.

FIG. 2-b represents a section through two separator plates 2, 2', an electrochemical cell 46 arranged between the two separator plates 2, 2', specifically a fuel cell, as well as elements of the next electrochemical cell arranged on the other side of the separator plate 2'. The section with respect to the represented elements corresponds to the section B-B of FIG. 2-a, but the distances of the different elements have been adapted with regard to a space-saving representation. The visible surface thus lies in a y-z plane of FIG. 1. It is clear from the sectioned representation that the electrochemical cell 46 carries a catalytic layer 42, 42' on the actual polymer electrolyte membrane (PEM) in each case at both sides, and this layer becomes the electrode and represented in a distanced manner here for a better understanding. These elements together represent the so-called membrane electrode unit (MEA). A gas diffusion layer (GDL) 44, 44' which consists in each case for example of an electrically conductive non-woven of graphite lines, is arranged in each case of both sides of the MEA.

Channel structures 28 are formed into the two layers 2a, 2b of the separator plate 2, and on both sides of the layer are used for distributing media. The channel structures 28 herein form the electrochemically active region 29. A first medium M1, specifically air is distributed on the upper side of the layer 2a. Coolant K is distributed on the lower side of this layer 2a, i.e. in the cavity between the two layers 2a and 2b. A second medium M2 is distributed on the lower side of the layer 2b. The second medium M2 is hydrogen in the case of a bipolar construction of the electrochemical system. In this case, M3 is again air and M4 is again hydrogen. With a monopolar construction of the electrochemical system, the second medium M2 is again air. In contrast, with a monopolar construction, the channels on both outer surfaces of the second separator plate 2' serve for the distribution of hydrogen which here represents the third and fourth medium M3 and M4. In the case of a bipolar construction, all separator plates of a stack are identical, and in the case of a monopolar construction, as the case may be two different separator plate variants alternate along the stack.

It is also clear from the section of FIG. 2-b that the bead 31 surrounds the through-opening 23 and thus seals off the hydrogen port. The bead 31 which peripherally seals off the electrochemically active region, in the represented section in contrast runs essentially along the outer edge 19 of the layer 2a of the separator plate 2, so that it is only sectioned once in the section shown here. It is also evident from the sectioned representation that the height of the beads 31, 32 amongst one another is essentially identical, wherein the height of the beads 31, 32 however is significantly higher than the height of the channel structures 28.

FIG. 2-c represents the layer 2a of the separator plates 2 which lies closest to the viewer in FIG. 2-a, in a plan view, thus again corresponds to a view in the z-direction of FIG. 1. Here, the design of the beads 31, 31' and 32 is to be dealt with in more detail. The bead 31' peripherally surrounds the port opening 25 and herein, disregarding the waved structure of the bead itself, has a small, essentially constant distance to the edge of the port opening 25. The bead 31 surrounds the port opening 26' in a comparable manner, but as a rule has an essentially circular course without a wave structure. Here too, the distance to the edge of the port is essentially constant. The bead 32 runs along and distanced to the outer edge 19 of the layer 2a of the separator plate 2 and herein not only encloses the electrochemically active region 20 which it seals off, but also the ports 22, 23, 23', 26, 26' and 27, together with the beads 31 sealing them. In the represented example, the bead 32 comprises several sections 35, in which the bead roof has a wave-like course. These sections 35 considered per se, macroscopically have a straight-lined course. It is evident that the sections 35, in which the bead 32 has a wave-like course of the bead roof, are arranged in each case in elongate, straight-lined sections of the sealing system, whereas relatively greatly curved regions of the bead 32, such as the region S surrounded by an oval, have a shape of the bead roof which corresponds to the total extension direction of the bead 32 in respective section, thus has no periodic wave-like course.

It can also be recognised from FIG. 2-c that air flows out of the port 27 along the continuations 33 through the bead 31, in order to hence get to the electrochemically active region 29 where the oxygen contained in its reacts with protons which enter through the MEA. The air which is depleted of oxygen in such a manner and has a high moisture content as a result of the reaction, then flows further downwards to the continuations 33 and there passes the bead 31 anew and is led via the port 22 to the end plate. The continuations are herein formed into the flanks of the bead 31 such that the sealing is not compromised.

FIG. 3 basically represents the size ratios and angular details in a sealing system of a separator plate, as are applied hereinafter. The section of FIG. 3 herein corresponds for example to the section C-C in FIG. 2c, thus lies in a plane parallel to the y-z plane of FIG. 1. The total width of a bead 3 of a sealing system is indicated at $W_T$, and the width of the bead roof 39 is indicated at $W_D$. The inner and the outer base width $W_I$ and $W_A$ respectively are identical in the considered symmetrical bead cross section, so that for simplification, the term W is used instead of the different terms $W_I$, $W_A$. This similarly applies to the inner and outer flank angle $\alpha_I$ and $\alpha_A$, which are analogously indicated in a simplified manner by $\alpha$. The height of a bead in an individual layer 2a, 2b of a separator plate 2 is indicated at H. FIG. 3 furthermore illustrates the different sections of a cross section of a bead 3 from the right to the left: subsequent to a first bead foot 37 is a bead flank 38, and the bead roof 39 connects after a further bend point. On the other side of the bead roof, a further bead flank 38' is subsequent to a further bend, and after this comes the second bead foot 37'. The bead feet are defined as the boundary points which are adjacent to a bead flank at their side which is away from the bead roof and on which the tangent to the course of the layer runs parallel to the middle plane of the separator plate 2. If a bead is considered independently of its function as a sealing element 32 around an electrochemically active region 29 or as a sealing element 31, 31' of an inner edge, then here and hereinafter it is indicated at 3.

FIG. 3 further illustrates as to how the two layers 2a, 2b of a separator plate 2 are designed in an essentially mirror-symmetric manner and are in surfaced (extensive) contact with one another in the region outside the bead 3, more precisely beginning at the bead feet 37, 37'. The representation of the channel structure has been done away with, and here the explanations in the context of FIG. 2-b are referred to.

The embodiments concerning FIGS. 1 to 3 apply to the separator plates of the state of the art as well as to the separator plates according to the invention.

The wave-like course of a section of a bead 3 of the state of the art, with which the bead roof 39 extends with a constant width $W_D$, specifically 1.6 mm, in a wave-like manner with at least two wave periods with a wavelength λ, is show in FIG. 4 in three part-pictures, by way of a detail of an individual layer 2a of a separator plate 2. The sectioned representation of FIG. 4-c herein corresponds equally to all three section lines AD-AD, BD-BD and CD-CD which are given in FIG. 4-b. The two bead flanks 38, 38' have a constant base width W of 0.7 mm in each case, over the entire course. The total width of the bead 3 $W_T$ is thus 3 mm. Because the base width of the bead flanks 38, 38' does not change over the course of the bead, and the base width of the bead flanks 38, 38' at both sides of the bead roof 39 is likewise identical, the bead consequently has a uniform flank angle α. A differentiation of the flank angle into the outer angle which is to say the flank angle in the convex section, $α_A$, and the inner angle which is to say the flank angle in the concave section, $α_1$, is thus not possible with the separator plate 2 of the state of the art. The angles α are 35° in each case. FIG. 4-b moreover underlines the fact that the amplitudes of the respective bead feet and of the two transition curves between the bead roof and the bead flanks adjacent thereto are identical.

FIG. 4-b further illustrates the convex and concave regions which extend in each case between two dashed lines, which is to say the section lines CD-CD which in each case represent a perpendicular to the tangent to the neutral lines of the bead roof 39. Apart from these, the upper and the lower inner radii no and nu and the upper and lower outer radii $r_{AO}$ and $r_{AU}$ are also derived from virtual circles which are indicated by double-dot dashed lines. Whereas an above-average stiffness of the beads is given in the concave regions, in which thus inner radii are present, this is below average in the convex regions, in which outer radii are present. This is a consequence of the inner support in the concave regions due to the bead sections facing one another. The regions of a low bead stiffness are indicated at g, the regions of a high bead stiffness are indicated at h. Leakages can occur due to this non-uniformly distributed bead stiffness, since media can flow through the sections of a low bead stiffness and penetrate into regions, in which these media should not enter. The present invention provides a remedy for this.

Comparable representations of a bead 3 as represented in FIG. 4 are given in FIG. 5, but here now for a first embodiment of a separator plate 2 according to the invention. Whereas in the preceding example of the state of the art, the cross sections perpendicular to the tangent to the neutral lines of the bead roof 39 are identical at all points of the wave-like course of the bead roof 39, here they significantly differ from one another. For this reason, FIG. 5 comprises three cross-sectional representations, wherein FIG. 5-c represents the cross section at inflection points, i.e. the sections AE-AE and DE-DE of FIG. 5-b. FIG. 5-c thus corresponds to FIG. 4-c, FIG. 5-d represents the cross section BE-BE at the wave peak and FIG. 5-e the cross section CE-CE at the wave trough, of the bead of FIG. 5-b. The width of the bead roof 39, $W_D$ remains constant over the entire wave-like course of the bead roof 39 and is 1.6 mm as in the preceding example of the state of the art. The inflection points which delimit the convex sections of the bead 3 from the concave sections, as in the preceding example are represented by dashed lines which is to say lie on the two section lines AE-AE and DE-DE. The line T marks the main extension direction of the bead 3 and results from the connection line of the inflection points of the neutral lines of the bead roof. In the convex regions (elements of the bead flank labelled with index v), whose bead flanks 38, 38' are characterised in FIG. 5-b by a hatching in each case, the base width $W_v$ of the respective bead flanks 38, 38 is reduced such that beginning at the inflection point, it reduces up to the apex point and increases again from the apex point up to the next inflection point. The base width at the inflection points is 0.85 mm, and at the apex point in contrast is only 0.65 mm. In the concave regions (elements of the bead flank labelled with index c), the width $W_I$ of the respective bead flank 38, 38' in contrast runs in a constant manner with a base width of 0.85 mm. The total width of the bead $W_T$ thus alternates between 3.1 and 3.3 mm. The amplitude of the bead feet here is somewhat larger than the amplitude of the transition lines between the bead roof and bead flans and the ratio is roughly 1.25:1.

The flank angle of the concave region $α_c$ accordingly remains constant over the respective concave region, and it is 35°, as the angle α at the inflection points. In contrast, the flank angle $α_A$ of the convex region, beginning at the inflection point, increases from 35° to 60° at the apex point and then reduces again to the next inflection point to 35°. The bead flank in the region, in which it has a low bead stiffness in the state of the art—cf. the characterisations g in FIG. 4-b—is stiffened by way of the steeper flank angle, so that as a whole, the bead has a constant stiffness over its wave-like course.

Here, it is to be noted that the references $W_v$ and $α_v$ each relate to the convex sections, and the references $W_c$ and $α_c$ each relate to the concave sections and thus jump from one bead flank to the opposite one at each inflection point.

FIG. 6 again with five part-pictures represents a second embodiment of a separator plate 2 according to the invention, by way of details of its bead 3. Again, the cross section at the inflection points, which is represented in FIG. 6-c, corresponds essentially to the cross section of FIG. 4-c, since the bead 3 here seems to be formed symmetrically. However, FIG. 6-b illustrates the fact that the bead flanks 38, 38' in the concave regions between the inflection points are each widened, so that here too, a bead 3 as a whole has an asymmetrical course.

The bead 3 of the embodiment according to FIG. 6 basically differs from the bead 3 of the embodiment according to FIG. 5 in that the bead roof 39 is designed somewhat more narrowly, specifically only has a width $W_D$ of 1.2 mm. The base width of the bead flanks W is 0.6 mm at the inflection points. The convex flank sections of the bead extend with this base width $W_v$ from inflection point to inflection point. In contrast, the base width of the concave flank sections $W_c$, beginning at an inflection point, enlarges from 0.6 mm to 0.8 mm at the wave trough, so as to reduce again to 0.6 mm in its course up to the next inflection point. The total width $W_T$ of the bead 3 in this embodiment varies between 2.4 and 2.6 mm.

Accordingly, the flank angle of the convex flank sections $α_v$ remains constant, and here it is 34°. In contrast, the flank angle of the concave $α_c$ flank $α_I$ decreases over the course of the concave section from inflection point to inflection point, from 34° to 26° at the wave trough, so as to increase again to 34°. On account of this, the bead stiffness reduces in the regions which in FIG. 4-b are characterised by h due to their above-average bead stiffness, and the bead stiffness is thus homogenised at both bead flanks 38, 38' over the wave-like course of the bead 3, so that leakages are prevented. The regions, in which the base width of a bead flank 38, 38' changes, are characterised by hatching in FIG. 6-*b*.

Rounding up, it should be emphasised that the amplitudes of the bead feet are roughly only ⅔ of the amplitude of the transition lines between the bead roof 39 and the bead flanks 38, 38'.

FIG. 7 represents an embodiment of the invention, with which the base width of the bead flank $W_A$ decreases and increases again over the convex sections and the base width of the bead flank $W_I$ increases and reduces again over the concave sections. A hatching of the regions, in which the base width changes, has therefore been done away with. As with both preceding embodiment examples, T marks the main extension direction of the bead in the represented detail. The flank angle $\alpha_v$ over a convex section thus undergoes an increase up to the apex point and a decrease follows this, and in a concave section the flank angle $\alpha_c$ in contrast undergoes a decrease, subsequent to which an increase follows after the apex point. The embodiment example according to FIG. 7 thus unifies both approaches which have been applied separately from one another in the embodiment examples of FIGS. 5 and 6, for homogenising the bead thickness over the wave-like course of the bead roof, by which means a particularly effective and thus advantageous homogenisation of the bead thickness is obtained.

Specifically, the width of the bead roof $W_D$ is 1.2 mm, whereas the bead flanks at the apex point which is further from the main extension line T have a minimum of their width $W_A$ of 0.6 mm, which is followed by an increase up to the next inflection point to a width W of 1 mm and further up to the apex point lying closer to the main extension line T to a maximum of the width $W_I$ of 1.4 mm. The flank angles α at the inflection points are 21°, and the flank angles α are therefore shallower than in the preceding embodiment examples. The flank angle $\alpha_A$ increases to 42° towards the apex point remote from to the main extension line T, and the flank angle $\alpha_I$ decreases to 16° towards the apex point lying closer to the main extension line T.

It is particularly noticeable that the total width $W_T$ of the bead 3 remains constant over the complete section, in which the bead roof 39 runs in a wave-like manner, by which means the spatial requirement of the embodiment according to FIG. 7 is particularly low, so that this embodiment is particularly advantageous. The total width $W_T$ of the bead 3 is 3.2 mm here.

FIG. 8 illustrates a further embodiment of a separator plate 2 according to the invention, now on its own and by way of a plan view of a section of the bead 3, whose bead roof runs in a wave-like manner in the represented section. As in the embodiment example of FIG. 7, the flank angle of the convex sections is enlarged, as well as the flank angle of the concave sections reduced. Accordingly, the base widths at the apex points, thus at the wave peaks and troughs, are enlarged compared to the base widths of the inflection points. As with the embodiment example of FIG. 7, the total width $W_T$ of the bead 3 runs in a constant manner in the represented section with a wave-like course of the bead roof 39. Whereas the bead feet run in a straight line in the embodiment example of FIG. 7, here the bead feet run with a significantly reduced amplitude, which is roughly 0.45 times the amplitude of the delimitation lines of the bead roof.

FIG. 9 represents a section of a bead 3 of a separator plate 2 according to the invention, said bead comprising continuations 33 on both bead flanks 38, 38', as has already been explained in the context of FIG. 2. Here, it is clear that the continuations on both bead flanks 38, 38' are periodically arranged at a distance λ/2, and specifically in each case in the region of the inflection points of the wave-like course of the bead roof 39. The continuations 33 serve for leading a medium through the sealing barrier of the bead 3, and this being at that surface of the layer 2*a* of the separator plate 2 which is way from the viewer, specifically between the two layers 2*a* and 2*b*. It is evident from FIG. 9 that the continuations each consist of two feet which in FIG. 9-*b* extend vertically, and of two flanks as well as a roof, wherein the feet of the continuations, although lying in the same plane as the bead feet, the total height of the continuations however is smaller than the height of the bead 3, so that the continuations only marginally influence the pressing behaviour of the bead. The bead feet 37, 37' are interrupted in the region of the continuations. The continuations 33 are only formed in the layer 2*a* lying at the top. The bead of this embodiment corresponds to that of the embodiment according to FIG. 5 with regard to its remaining design, in particular with regard to the wave-like course of the bead roof 39 and the reduction of the base width $W_A$ and the increase of the flank angle $\alpha_A$ in the convex regions relative to the adjacent inflection points.

FIG. 10*a* shows a section of a bead 3 of a separator plate 2 according to the invention, said separator plate having two continuations 33 distanced to one another by a wavelength λ, only on the bead flank 38 which lies at the bottom in the figure. The continuations here serve as a barrier between the channel structure which is not represented and which connects below the represented detail, and the sealing structure. They prevent medium outside the electrochemically active region from flowing past the gas diffusion layers 44 and 44' shown in FIG. 2-*b* and thus not being available to the electrochemically active electrodes 42, and 42'. This would lead to unacceptable loses on utilisation of the combustion gases and thus to a significant reduction in the efficiency of the electrochemical cell.

Figure 10B:
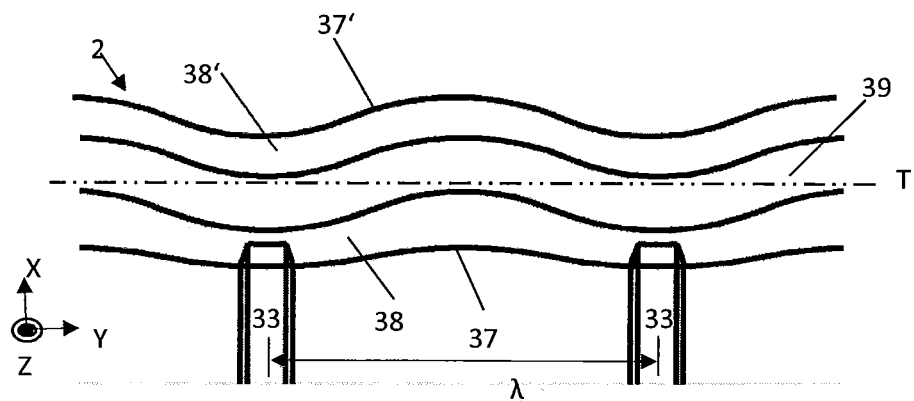
FIG. 10b is a plan view of another embodiment of a detail of a sealing system of a further separator plate according to the invention with delimination elements which are adjacent to the sealing system.
Figure 10C:
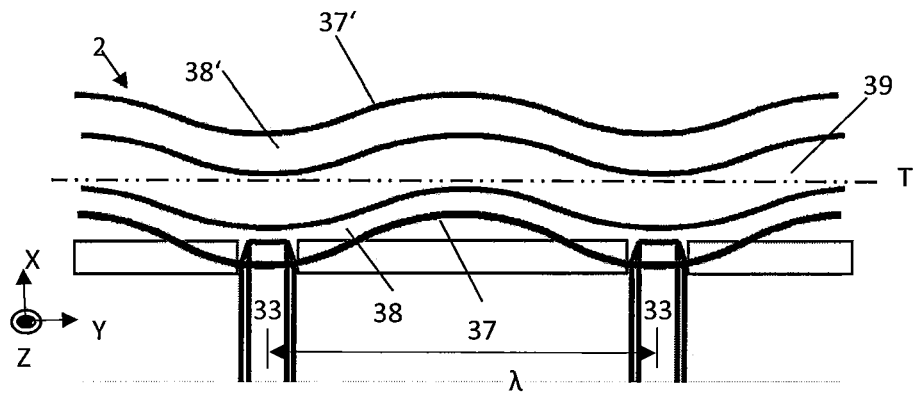
FIG. 10c is a plan view of another embodiment of a detail of a sealing system of a further separator plate according to the invention with delimination elements which are adjacent to the sealing system.

FIG. 10*b* shows a section of a bead 3 of a separator plate according to the invention. This is an embodiment, in which only one bead flank 38 (with bead foot 37) changes, whereas the flank 38' which in this case lies opposite the continuations remains constant and thus the bead foot 37' runs parallel to the bead root 39. The increase of the flank angle in concave regions and represented in FIG. 10*b* is only one possibility. In a further embodiment (represented in FIG. 10*c*) the flank angle increases from the infection points (α and $\alpha_v$=21°) to the apex point in the concave regions ($\alpha_I$=32°). The advantage of the respective embodiment results from a targeted possibility of adapting the bead characteristics to the geometric changes by way of incorporating the continuations 33 into the bead flanks 38

The described, single-side changes of the flank angle is not only limited to the regions, in which the continuations 33 are incorporated into a bead flank, but can analogously be applied n any other region of the wave-like bead region on a separator plate 2, 2'. Here, either the bead flank which faces the active region or the outwardly directed bead flank can be adapted and this can also be varied individually in the different regions of the separator plate, according to the local demands on the bead characteristics.

A further embodiment of a separator plate 2 according to the invention is shown in FIG. 11 by way of an oblique view and a plan view, wherein here, both layers 2*a*, 2*b* of the separator plate 2 are represented, in contrast to the previous oblique views with the exception of FIG. 9-*a*. Here, the bead flanks run with a constant base width, and here weld connections 60, 60' which essentially with their radius run concentrically to that of the bead feet 37, 37' of the two layers 2a, 2b of a separator plate 2 are sectionally provided in the convex regions, for homogenising the bead pressing. The extension of the weld connections 60, 60' here corresponds precisely to the extension of the convex region, i.e. from a perpendicular to the tangent to the neutral lines of the bead roof 39 through a first inflection point up to the a perpendicular up to the tangent to the neutral lines of the bead roof 39 through a second inflection point adjacent to the first inflection point. The weld connections are herein provided in all shown convex regions, so that weld connections are given on both sides of the bead.

FIG. 12 shows a variant of the embodiment of FIG. 11, with which embodiment it is merely the extension of the weld seams which is reduced, compared to the embodiment of FIG. 11. Here it is roughly 20% of the wavelength λ.

The invention claimed is:

1. A separator plate for an electrochemical system, comprising two metallic individual plates,
    wherein the metallic individual plates comprise through-openings for an operating media and for coolant, as well as distribution structures which are formed into the metallic individual plates and which each communicate with at least two of the through-openings,
    wherein an integral peripheral sealing structure is formed into each of the metallic individual plates at least peripherally around an electrochemically active region and distanced from this and peripherally around at least one of the through-openings and distanced from the edge of these through-openings,
    the integral peripheral sealing structure of the metallic individual plates having a cross section comprising a bead roof extending between two bead flanks and, at least in sections, two bead feet, and each bead flank extending at a flank angle relative to a plane of a respective metallic individual plate, the sealing structure extends, at least in sections, in a wave-like manner,
    the bead roof maintains a constant width while a base width of one of the two bead flanks in a region in which the one of the two bead flanks extends in convex curvature decreases by at least 5%.

2. The separator plate according to claim 1, wherein the width of the bead roof is between 0.2 and 2 mm.

3. The separator plate according to claim 1, wherein the flank angle in the region of convex curvature is between 20° and 65°.

4. The separator plate according to claim 3, wherein a change of the flank angle in the region of convex curvature with respect to the flank angle adjacent to said region of convex curvature at an inflection point corresponds to an increase of up to 100%.

5. The separator plate according to claim 1, wherein the base width of the one of the two bead flanks in a region in which the one of the two bead flanks extends in convex curvature decreases by between 5 and 50%.

6. The separator plate according to claim 1, wherein the sealing structure as a whole extends linearly in a region of a wave-like extension of the bead roof.

7. A separator plate for an electrochemical system, comprising two metallic individual plates,
    wherein the metallic individual plates comprise through-openings for an operating media and for coolant, as well as distribution structures which are formed into the metallic individual plates and which each communicate with at least two of the through-openings,
    wherein an integral sealing bead is formed into each of the metallic individual plates at least peripherally around an electrochemically active region and distanced from this and peripherally around at least one of the through-openings and distanced from an edge of these through-openings,
    forming the integral sealing bead into each of the metallic individual plates forms a bead roof extending between two bead flanks at a distance from the metallic individual plates and, at least in sections, two bead feet, wherein the integral sealing bead extends, at least in sections, in a wave-like manner,
    the bead roof has a constant width and a base width of one of the two bead flanks in a region where the one of the two bead flanks extends in convex curvature decreases by at least 5%.

8. The separator plate according to claim 7, wherein the width of the bead roof is between 0.2 and 2 mm.

9. The separator plate according to claim 7, wherein a flank angle of a concave section is between 15° and 60°.

10. The separator plate according to claim 9, wherein a change of the flank angle in the concave section with respect to the flank angle adjacent to said concave section at an inflection point corresponds to a reduction of up to 50%.

11. The separator plate according to claim 7, wherein an increase of a base width within a concave section is between 5 and 100% of the base width of the same bead flank at one of the inflection points delimiting the concave section.

12. The separator plate according to claim 7, wherein a total width of the sealing bead from bead foot to bead foot is constant in a region of a wave-like extension of the sealing bead.

13. The separator plate according to claim 7, wherein the sealing bead as a whole extends linearly in the region of wave-like extension of the bead roof.

14. A separator plate for an electrochemical system, comprising two metallic individual plates,
    the metallic individual plates comprise through-openings for an operating media and for coolant, as well as distribution structures which are formed into the metallic individual plates and which each communicate with at least two of the through-openings,
    an integral sealing bead formed into each of the metallic individual plates around an electrochemically active region and distanced from this and peripherally around at least one of the through-openings and distanced from an edge of these through-openings,
    the integral sealing beads comprising a bead roof extending between two bead flanks at a distance from the metallic individual plates and, at least in sections, two bead feet,
    the bead roof has a constant width while a base width of a first of the two bead flanks decreases by at least 5% in a region where the first of the two bead flanks extends with convex curvature and a base width of a second bead flank, opposite the first bead flank, increases in a region of concave curvature.

* * * * *